March 4, 1969     W. L. ROLLWITZ ET AL     3,431,551

DEPTH MEASURING ULTRASONIC TRANSCEIVER

Filed Oct. 2, 1967

William L. Rollwitz
Harvey S. Benson
INVENTOR.

BY Donald Gunn

United States Patent Office 3,431,551
Patented Mar. 4, 1969

3,431,551
DEPTH MEASURING ULTRASONIC
TRANSCEIVER
William L. Rollwitz and Harvey S. Benson, San Antonio,
Tex., assignors to Southwest Research Institute, a trust
estate of Texas
Filed Oct. 2, 1967, Ser. No. 672,092
U.S. Cl. 340—1                                    5 Claims
Int. Cl. G01s 9/66

ABSTRACT OF THE DISCLOSURE

An ultrasonic frequency modulated echo system which utilizes a single transducer for both transmitting and receiving. The simplified circuitry includes a single transistor with a tank circuit which functions as a transmitter-oscillator as well as a mixer and amplifier for the echo signals. The frequency of the oscillator is linearly modulated by a motor driven capacitor, and the beat frequency signals representative of range are indicated on a frequency meter and also sent to a remote location by radio waves.

RELATED APPLICATIONS

Figure 1:
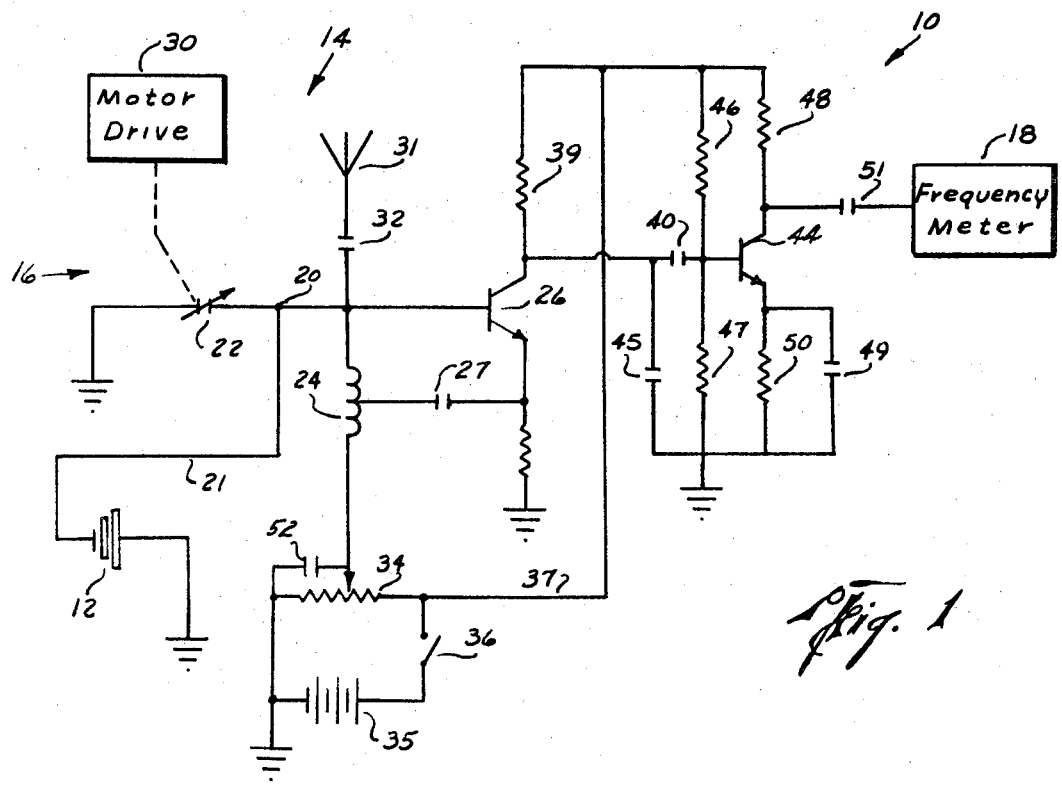

Applicants have a related application entitled "New and Improved Ultrasonic Transceiver," Ser. No. 672,091, filed of even date herewith.

SUMMARY OF PROBLEM AND INVENTION

The benefits of depth measurements in opaque mediums are readily apparent to those skilled in the art. Numerous applications in materials testing and handling may be cited as an example. An additional category of use is in the area of physiological measurements. Heretofore, the solution to the problem has been the use of pulsed ultrasonic radiation sources cooperating with a timer which measures the elapsed time between signal transmission and return of the reflected wave front. Knowing the velocity of the ultrasonic wave front in the medium, calculations obtain the depth or range information as a function of the elapsed time for transmission. As will be appreciated, complex apparatus is engendered by this arrangement. At least, duplicate antennas or else a single antenna with multiplexing apparatus is required in addition to the timing apparatus. Jitter in the timing apparatus is a problem usually requiring expensive and complicated circuitry to provide a reliable time indication which is correlated to the depth measurement. Moreover, it should be noted that such devices usually are insensitive to frequency shift, and therefore, are unable to output both depth measurement information as well as flow velocity information. With the view of the prior art and its inherit complexity, and with a further view of providing apparatus accommodating the above noted functions, the present invention is summarized as an ultrasonic transceiver providing depth measurements and relative velocities within a medium utilizing the transducer transmitting signals having time indicia thereon incorporating means measuring the elapsed transmission time to obtain the desired indications.

A related object of the present invention is to provide a new and improved ultrasonic transceiver separating time shift signals related to interface depth and Doppler shift signals which are the result of relative movements within the medium.

Another object of the present invention is to provide a new and improved continuous wave sweep signal generating device wherein frequency shift indicates depth measurements in the form of a beat frequency obtained in the tank circuit.

Still another object of the present invention is to provide an ultrasonic transceiver incorporating only one active element in the transceiver which is devoid of timing circuits, multiplexers, multiple radiating elements, and so on.

Yet another object of the present invention is to provide a new and improved ultrasonic transceiver utilizing the frequency differential between instantaneously transmitted frequency and reflected frequency as an indication of depth measurements in the medium which are continuously provided.

An important object of the present invention is to provide a new and improved ultrasonic transceiver utilizing a tank circuit comprising the capacitance of the transducer which is also used as a mixer of the transmitted signal and reflected signal whereby the difference in the two signals yields range information.

Figure 2:
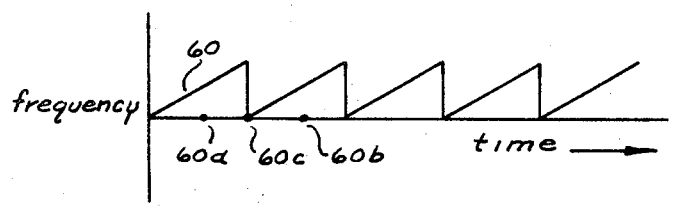

Other objects and advantages of the present invention will become more readily apparent from a consideration of the specification and drawings wherein:

FIG. 1 is a schematic wiring diagram of the preferred ultrasonic transceiver of the present invention; and, FIG. 2 is a graphic representation of the wave form transmitted by the present invention.

Attention is first directed to FIG. 1 of the drawings which illustrates in schematic wiring form the preferred embodiment of the present invention. The circuit means 10 incorporates a transducer means 12 which is appropriately coupled to a medium in which depth or range information is desired. Signal generating means indicated generally at 14 provides a signal to the transducer means 12 whereby radiations are emitted into the medium in a conventional manner for reflection by the interfaces in the medium. Means indicated at 16 are provided for placing time indicia on the signal generated by the means 14 and transmitted by the transducer means 12. The time indicia placed on the transmitted signal is used on return of the reflected wave front such that a means 18 responsive to the frequency difference between the signal transmitted and the signals received by the means 12 indicates the depth of the interface.

Considering the invention in more detail, attention is first directed to the details of the circuit means 10 shown in FIG. 1. The signal generating means 14 is connected with the plates of the transducer means 12 by the conductor 21 which communicates with a nodal point having a number of circuit elements connected thereto. Attention is first directed to the impedance 22 which is a variable capacitor in the preferred embodiment. One side of the capacitor 22 is grounded and the other side is connected to the point 20 to which is also communicated a radio frequency inductor 24. The inductor 24 is connected to the base of a transistor 26 and a tap on the inductor 24 communicates through a coupling capacitor 27 to the emitter of the transistor 26. It will be recognized that a tank circuit is formed by the elements above described and signals provided to the base and the emitter of the transistor 26 sustain oscillations in the tank circuit.

The tank circuit noted above incorporates the impedance of the inductor 24 and the parallel combination of the capacitance in the transducer means 12 and the variable capacitor 22. Attention is particularly directed to the variable capacitor 22 which is shown as a mechanically driven impedance connected to a motor-drive mechanism 30. The motor-drive mechanism cyclically rotates the capacitor to likewise vary the oscillations generated in the tank circuit. Attention is momentarily directed to FIG. 2 which illustrates one frequency sweep as a function of elapsed time. The use of a variable capacitor with the motor-drive mechanism 30 time modulates the output of the tank in the illustrated manner. While it is not mandatory that the wave form be triangular, the suggested wave form is advanced in lieu of other wave forms which will be left to the designer within the scope of the present disclosure.

An antenna 31 is communicated with the nodal point 20 by a coupling capacitor 32. The antenna transmits the signals in the tank circuit to a nearby receiver (not shown) to telemeter the signals in the transceiver 10.

The tank circuit inductor 24 is connected with a variable bias supply incorporating the resistor 34 connected across the voltage source 35. The apparatus is turned off and on by a switch 36 which communicates electric power to the resistor 34 and also through a conductor 37 to the collector circuits of the transistors as shown.

As described above, the signal generating means 14 is communicated with the transistor 26 with connections at the base and emitter. The conductor 37 communicates B+ supply to the collector resistor 39 of the transistor 26. Signals applied to the base of the transistor 26 result in a voltage fluctuation across the collector load 39 which is communicated in a conventional manner by a coupling capacitor 40 to an additional transistor 44. Signals on the collector of the transistor 26 are filtered by a capacitor 45 to ground whereby the high frequency components in the signal are materially attenuated. The transistor 44 is provided with base bias by a voltage divider including resistors 46 and 47. The conductor 37 above noted provides B+ to the collector load resistor 48, and emitter bias is provided by the parallel combination of the capacitor 49 and the series resistor 50. The output of the amplifier transistor 44 is coupled through a capacitor 51 to the frequency meter 18, it being previously noted that the means 18 indicates the depth or range information in the medium as a function of the frequency differential.

While the foregoing describes the circuit illustrated in FIG. 1 from the point of view of identifying the appropriate interconnections and some of the functions of the circuit elements, attention is directed to the circuitry as a whole to obtain an understanding of its operation. In the first instance, the device may be described as a marginal oscillator wherein the tank circuit is particularly sensitive to changes in the transducer means 12. As will be noted, the transducer means 12 is used for coupling ultrasonic radiations into a medium. Also, the transducer means 12 is responsive to reflected vibrations within the medium and a proportionate voltage is developed in the transducer means and therefore in the tank circuit. This is a modulating signal which provides a beat frequency signal within the tank circuitry. By using the oscillator in a detuned condition, the reflections from the interface in the medium indicative of its range are mixed and amplified by the transistor 26. The signals at the collector of the transistor 26 are then filtered by the capacitor 45 which bleeds high frequency signals to ground. After filtering, the dominant frequency found in the tank circuit is essentially removed from the signal provided to the transistor 44 whereas the differential frequency is amplified by the transistor 44 for application to the frequency meter means 18. The frequency meter 18 is responsive to the frequency differential signal.

Elaboration on the frequency differential is perhaps helpful. It should be first noted that the frequency differential is a function of elapsed time required for the round trip of the wave front of radiation in the medium. That is to say, when the frequency of the signal generating means 14 is changed in a prescribed manner, the time required to return the instantaneous frequency previously transmitted at a selected instant indicates the range or depth of the interface in the medium. When the reflected signal is then added to the frequency generated in the signal generating means 14 at the time of the return of the reflected signal, the beat frequency is a function of the elapsed time of transmission.

Considering FIG. 2, which illustrates a linear sweep wave form wherein the frequency is a function of time, frequency sweep 60 is transmitted during an interval of time noted on the abscissa of the graph. The reflected signal is returned during the interval between points 60a and 60b on the abscissa of the graph. The reflected signal is less than the instantaneously transmitted signal during the interval 60a and 60c on the graph. However, the reflected signal is greater than the instantaneously transmitted signal during the interval 60c to 60b on the graph. Without regard to the relative sign of the beat frequency, the absolute magnitude of the frequency differential is constant and the fact that the reflected signal is greater in frequency than the transmitted signal during one interval and lower in frequency during another interval is immaterial since the frequency meter 18 is responsive only to audio frequency input related to the frequency differential. Therefore, the signal provided to the frequency meter 18 is the absolute frequency differential without regard to phase or sign reversal whereby accurate depth measurements are indicated at the frequency meter 18.

The device of the present invention can be used for stationary or moving interfaces. Given a medium in which the interface is moved away from the transducer means 12, those skilled in the art will appreciate that the total time of transmission to the interface increases as the interface is moved further from the transducer means 12. The frequency meter 18 indicates a larger differential frequency as the depth increases. The present invention is particularly useful in physiological systems in which the interface is constantly moving in an oscillatory manner. Consider, for instance, measurements of velocity of palpitating body organs which are located at a predetermined range from the body surface. By way of example, the depth below the surface of the body of a palpitating body organ might correspond to a frequency of 100 kilohertz. If the body organ were still, the range or depth signal would continue to be 100 kilohertz. However, since the body organ oscillates at its location, the 100 kilohertz signal is modulated by a Doppler shift signal resulting from its movements. The depth or range signal and the Doppler shift signal are mixed at the output indicated by the frequency meter 18. However, the location of the organ from the surface of the body is determined by the center frequency of the oscillations which in the above noted example is 100 kilohertz with equal frequency variations on each side of the center frequency. In this case, the variations about the center frequency indicate the instantaneous velocity of the body organ whereas the rate of variations relative to the outer frequency indicate the repetition rate of "pulse rate" of the body organ. If need be, band pass filters may be used with the present apparatus to isolate the various frequencies output by the transceiver 10.

While the foregoing describes the preferred embodiment of the present invention and illustrates its operation, the scope of the present invention is to be determined by the appended claims next following.

What is claimed is:

1. An ultrasonic transceiver, comprising:
   (a) transducer means for radiating ultrasonic energy into a medium coupled thereto, and also adapted to convert energy coupled from the medium into electrical signals;
   (b) signal generating means communicating an electrical signal to said transducer means;
   (c) circuit means including a single transistor means utilized in forming a signal having a desired frequency characteristic, said transistor means being connected in an oscillator circuit which incorporates said transducer means and which is so tuned and adjusted that oscillations thereof are marginally maintained;
   (d) means included in said oscillator circuit to vary the frequency thereof in a time patterned manner;
   (e) mixer circuit means communicating signals derived from said transducer means and representative of the vibrations coupled from the medium into said oscillator circuit;

(f) said oscillator circuit continuing operation in the presence and absence of signals from said mixer circuit means;

(g) an output circuit connected to said oscillator circuit for deriving an input signal representing the marginally formed signal from said oscillator circuit and the signal from said mixer circuit means; and (h) an output means connected to said output circuit for indicating depth in the medium as a function of frequency difference.

2. The invention of claim 1, wherein said mixer circuit means mixes the signal from said oscillator circuit with the signal from said transducer means, and including high frequency filtering means in said output means forming a low frequency signal representative of frequency difference.

3. The invention of claim 1, including:
(a) low frequency band pass means responsive to the signals of said mixer circuit means;
(b) amplifier means connected to said band pass means and to said output means.

4. The invention of claim 1, including:
(a) a tank circuit including an inductor resonating with a capacitor at least partially comprised of the capacitance of said transducer means, said tank circuit being connected between the emitter and base of said transistor means;
(b) a collector load impedance connected to said transistor means across which an output signal is developed and which includes frequencies of signals obtained from said oscillator circuit and said transducer means;
(c) low frequency band pass means responsive to the signals of said mixer circuit means, said means including a capacitor means connected to a signal ground; and
(d) an amplifier circuit means including at least a transistor means connected to said band pass means and having a collector load impedance across which an output signal is developed for connection to said ouput means.

5. The invention of claim 4 wherein said circuit means includes only two transistor means and utilizes a variable capacitor to vary the frequency of said oscillator circuit.

References Cited

UNITED STATES PATENTS

| | | | |
|---|---|---|---|
| 2,405,134 | 8/1946 | Brown et al. | 340—3 |
| 2,407,270 | 9/1946 | Harrison. | |
| 2,842,764 | 7/1958 | Harvey | 343—14 |
| 2,935,728 | 5/1960 | Morgan | 340—3 |
| 3,005,335 | 10/1961 | Erdman | 73—67.8 |
| 3,260,991 | 7/1966 | Laakmann | 340—15 |

RICHARD A. FARLEY, *Primary Examiner.*

U.S. Cl. X.R.

73—67.8; 340—3